United States Patent [19]
Krone et al.

[11] Patent Number: 5,502,817
[45] Date of Patent: Mar. 26, 1996

[54] ULTRA HIGH SPEED DATA COLLECTION, PROCESSING AND DISTRIBUTION RING WITH PARALLEL DATA PATHS BETWEEN NODES

[75] Inventors: Norris Krone, Annandale; Roger Pierson, Castleton, both of Va.; Glenn Connor, Laurel; Virgil Davis, Fulton, both of Md.

[73] Assignee: University Research Foundation, Inc., Greenbelt, Md.

[21] Appl. No.: 42,273

[22] Filed: Apr. 2, 1993

[51] Int. Cl.[6] ............................... G06F 13/38; H04J 3/02
[52] U.S. Cl. .................. 395/200.16; 395/200.1; 364/229.3; 364/240.1; 364/242.96; 370/85.15; 370/60; 340/825.07
[58] Field of Search ..................... 395/200, 250, 395/275, 325, 800, 200.16, 200.11; 370/85.5, 85.12, 85.14, 85.15, 60; 340/825.05, 825.06, 825.07

[56] References Cited

U.S. PATENT DOCUMENTS

| | | | |
|---|---|---|---|
| 4,468,734 | 8/1984 | Lanier et al. | 395/575 |
| 4,569,041 | 2/1986 | Takeuchi et al. | 370/60 |
| 4,815,071 | 3/1989 | Shimizu | 370/60 |
| 4,831,512 | 5/1989 | Nakai et al. | 395/200 |
| 4,930,122 | 5/1990 | Takahashi et al. | 370/85.15 |
| 4,947,317 | 8/1990 | DiGiulio et al. | 395/325 |
| 4,982,400 | 1/1991 | Ebersole | 370/85.15 |
| 5,165,019 | 11/1992 | Sweazey | 395/200 |
| 5,165,024 | 11/1992 | Sweazey | 395/325 |
| 5,229,993 | 7/1993 | Foudriat et al. | 370/85.3 |
| 5,243,596 | 9/1993 | Port et al. | 370/94.1 |
| 5,274,637 | 12/1993 | Sakamura et al. | 370/85.5 |
| 5,339,317 | 8/1994 | Tanaka et al. | 370/85.15 |

*Primary Examiner*—Krisna Lim
*Attorney, Agent, or Firm*—Jim Zegeer

[57] ABSTRACT

A high speed data collection processing and distribution system for coupling a plurality of digital data sources to a plurality of digital data processors. The system includes a plurality of segmented parallel data paths and a plurality of nodes connecting said parallel data paths in an endless ring. Each node includes an input connector for connecting the end of one of said segments of parallel data paths on a one-for-one basis; a data multiplexer, a plurality of node parallel data paths in the node corresponding to the segmented parallel data paths, respectively, connected to the input connector and the data multiplexer such that data input to the multiplexer corresponds to respective ones of the segmented parallel data paths. A processor is coupled to said node parallel data paths, and as a second input to the multiplexer a common source of clock and slot signals is independently connected to said control processor in each node, respectively, for controlling the timing thereof. Each node also includes transmit and receive FIFO buffer memories, address, exclusive source and pattern match circuits and a local clock distribution circuit.

5 Claims, 3 Drawing Sheets

ULTRA HIGH SPEED DATA COLLECTION, PROCESSING AND DISTRIBUTION RING WITH PARALLEL DATA PATHS BETWEEN NODES FUSION SYSTEM

FIELD OF THE INVENTION

The present invention relates to a ultra high speed parallel data fusion system for significantly improved data collection, discrimination processing and distribution.

BACKGROUND ART

Takahashi et al. U.S. Pat. No. 4,930,122 discloses a circuit which reassembles segmented packets into the original message by use of message buffers and seeks to use minimum buffers in each node. In contrast, the present invention does not employ the packet and in the present invention, each message on the transmission loop can be considered to be self-contained and independent of any other message. FIFO buffers employed in the invention and described more fully hereafter, is used for performance reasons and not for the purpose of packet reassembly. The multilevel security functionality of the present invention and the method of parallel data transmission are not disclosed.

Takeuchi et al. U.S. Pat. No. 4,569,041 relates to an integrated circuit/packet switching system. Nakai et al. U.S. Pat. No. 4,831,512 relate to a message processing system. Shimizu U.S. Pat. No. 4,815,071 also relates to a packet-switched communication network for efficiently switching non-burst signals. Foudriat et al. U.S. Pat. No. 5,229,993 relates to a combination of two new access methods for ring and unidirectional bus networks support high data rate integrated traffic. Sweazey U.S. Pat. No. 5,165,019 relates to a ring interconnect system architecture. Tanaka et al. U.S. Pat. No. 5,339,317 also relates to a packet communication network. Port et al. U.S. Pat. No. 5,243,596 relates to a data communication network for multi-casting and resource locking. Sakamura et al. U.S. Pat. No. 5,274,637 relates to a token-ring type local area network (LAN). DiGiulio et al. U.S. Pat. No. 4,947,317 relates to a communication protocol for a three node system. Sweazey U.S. Pat. No. 5,165,024 relates to a computer system interconnection. Ebersole U.S. Pat. No. 4,982,400 discloses a ring bus hub for a star local area network. Finally, Lanier et al. U.S. Pat. No. 4,468,734 disclose a method of purging erroneous signals from closed ring data communication networks capable of repeatedly circuiting such signals.

Lenart U.S. Pat. Nos. 4,794,593 and 4,769,813 and Fredricksson et al. U.S. Pat. No. 5,119,373 disclose closed ring of switching nodes which are time division multiplexed CTDM. Goertz U.S. Pat. No. 4,755,991 and Brandsma et al. U.S. Pat. No. 4,533,234 also disclose a ring shaped TDM system including a message channel used for an arbitration procedure between contending nodes. Jones et al. U.S. Pat. No. 4,633,246 disclose a closed ring TDM system in which alternate parallel paths are provided in case of a node failure.

SUMMARY OF THE INVENTION

This invention provides a data processing architecture for coupling a plurality of digital data sources and processors in which a plurality of nodes, one for each digital data source and/or digital data processor are coupled in a ring by a plurality of parallel ring data path segments connecting the nodes in a limitless ring, and incorporating a precision clock distribution system. Each node includes input and output connectors for connection to parallel ring data path segments and an internal parallel data path connected between the input connector and a storage and multiplexing circuit for message storage and to implement the synchronous parallel ring function. A second input to the storage register and multiplexer is coupled by a similar plurality of parallel data path segments coupled from a storage buffer which receives data from the local device, whether it be a workstation, data reader, or other equipment. This interface causes the ring node to appear to the host as a portion of its memory address space. A precision clock distribution system is utilized to provide ring clock signals to the ring shift elements of the multiplexer block. Incoming messages are presented to an address matcher, an exclusive source matcher, a pattern matcher, and receiver FIFO buffer. Clock and slot information is provided to each node via a global clock and slot distribution network.

The ring architecture of the present invention provides a high speed node-to-node bit transfer rate of 3.24 gigabits/ second. There need be no modification to the data source and it is interfaceable to multiple data sources and processors. The distribution of data can be to multiple types of workstations and, as between nodes, there can be total discrimination and selection. The invention is adaptable to multiple digital formals (MIL STD 1553, SCSI, VME, HSD, etc.). It is small, light weight, mobile, flexible, robust, adaptable, and can handle multiple levels of classified data as well as accept real-time data linked data. There is a reduction in the bandwidth requirements to the workstation. Moreover, for an unknown or coded destination node, data only need be sent once.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
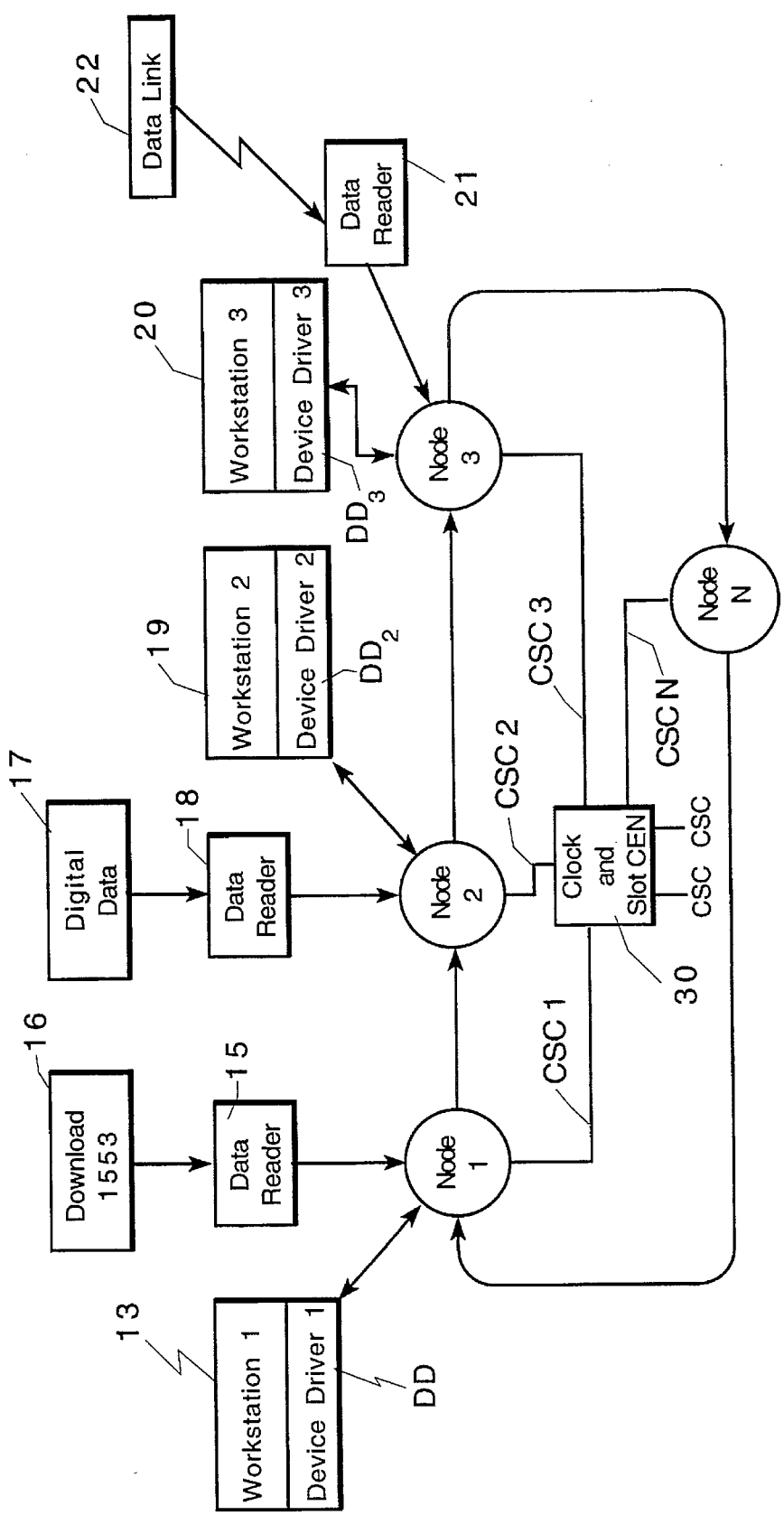
FIG. 1 is a schematic illustration of a high speed ring data transfer system incorporating the invention.

Referring to FIG. 1, a ring node data acquisition and distribution system is illustrated as having a plurality of nodes N1, N2, N3 . . . $N_N$, there being one for each digital source and/or data processor which are interconnected by a plurality of parallel ring data path segments connecting the nodes in an endless ring and a source of system clock and slot identify the ring signals to each node.

A pair of signals, the clock and its complement, as generated by clock and slot generator 30 are distributed to each node to indicate the precise time to shift a message (made up of parallel signal paths) to the next node in the ring. These clock signals occur at a frequency equal to that at which messages are shifted on the ring. The differential pair of signals (clock and complement) is used in order to increase noise immunity. The difference between these two signals is used to generate the local clock signals on each node card. Any noise that is picked up between the central clock source and the node card destination is likely to be present on both signals and therefore canceled out when the difference is taken. The binary levels used on the clock lines are the same as those used in standard ECL (emitter coupled logic) even though Gallium Arsenide circuitry is preferably used.

The slot signal is also distributed via central source 30 in a like manner to that of the clock signal. The timing skew parameters are not nearly so critical as those for the clock signal however. The slot signal indicates to the node card that any message contained in its transmitter can be shifted onto the ring on the next occurrence of the clock signal. The slot signal is generated by dividing the clock frequency by the number of nodes on the ring. The clock and slot signal conductors CSC to all nodes are of the same length. Thus, all nodes on the ring insert their messages at precisely the same time. On clock edges that do not occur when the slot signal is active, all the nodes are examining incoming messages that originated from other nodes on the ring.

As shown in FIG. 1, node 1 can be coupled via a device driver DD to workstation 1 and, at the same time, via a data reader 15 to download from a source using MIL STD 1553 data format. Node 2 can be coupled to one or more digital data sources 17 via its data reader 18 and, at the same time, deliver data via device driver DD2 to workstation 19. Similarly, node 3 can be coupled via device driver DD3 to workstation 20 and, via a data reader 21 to a remote data link 22 via a radio link, an infrared link, an optical fiber cable, or regular copper conductors.

Figure 2:
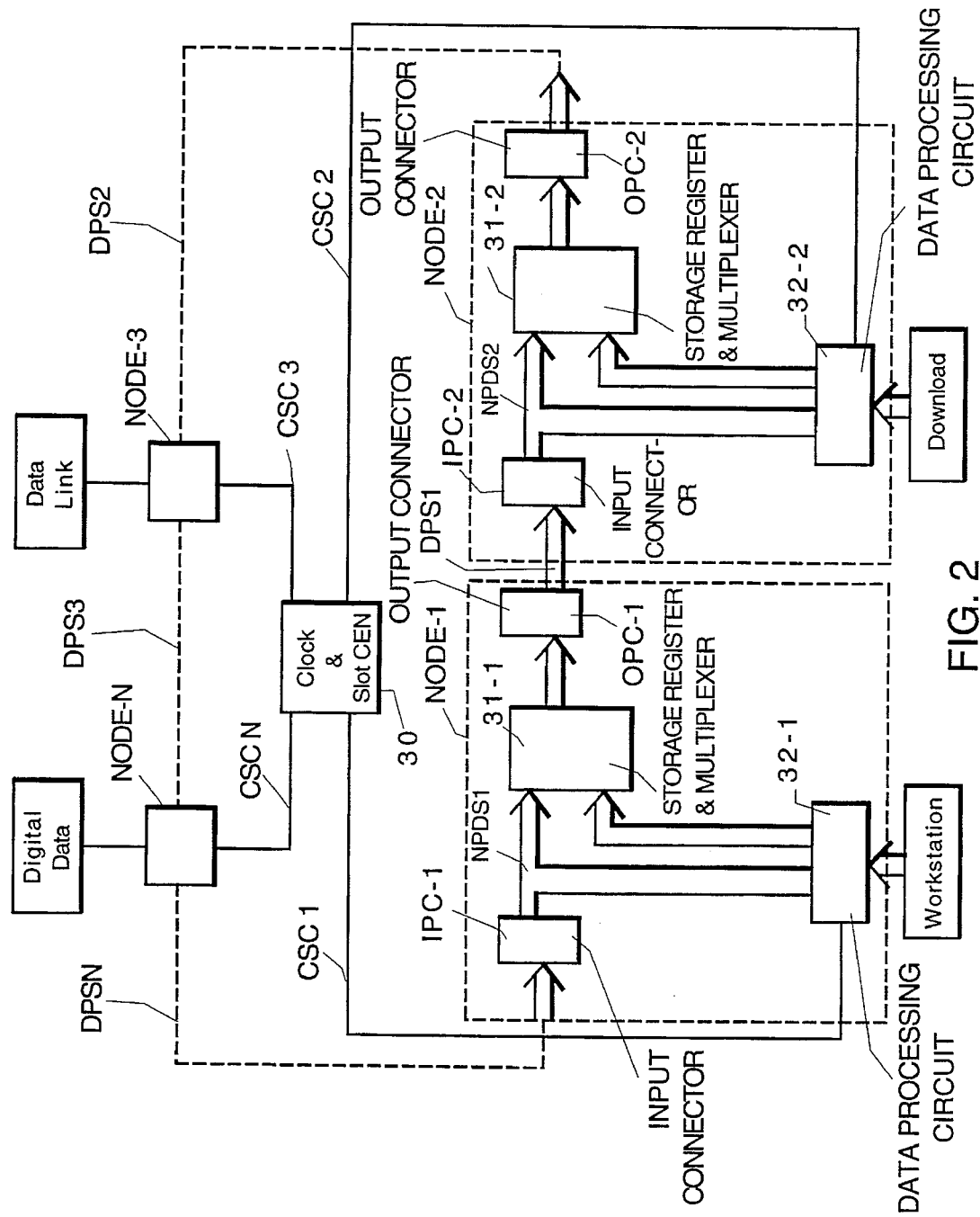
FIG. 2 is a block diagram illustrating the interconnection of major components of the nodes.

Referring now to FIG. 2, nodes 1, 2, 3 . . . N are connected by a plurality of ring data path segments DPS1, DPS2, DPS3 . . . $DPS_N$. The data path segments DPS1, DPS2, DPS3 . . . $DPS_N$ are constituted by multiple parallel paths shown in detail in FIG. 3 (data 0:127 (128 data lines denoted DATA 0 through DATA 127), destination 0:5, source 0:5, control 0:3, pattern 0:17) for a total of 162 parallel paths. In addition, the nodes are synchronized using clock and complement clock signals from clock and slot generator 30. As diagrammatically illustrated in FIG. 2, each node includes an input connector IPC1 and an output connector OPC1. A plurality of node parallel data path segments NPDS1 for node 1, and NPDS2 for node 2, and the remaining nodes have corresponding node parallel data paths. The node parallel path segments are connected to the input as one input of the node storage register and multiplexer 31 and also to the node local processing circuitry 32 (shown in greater detail in FIG. 3). The local VME interface and VME connector are coupled via local data processing circuitry 32 as a second input to storage register and multiplexer 31. A second plurality of node parallel data paths 2NPDS1 couples the node processor 32-1 to the node storage multiplexer 31-1. Finally, a third plurality of node parallel data paths 3NPDS1 couples the output of the node storage and multiplexer unit 31 to output connector OPC2.

Figure 3:
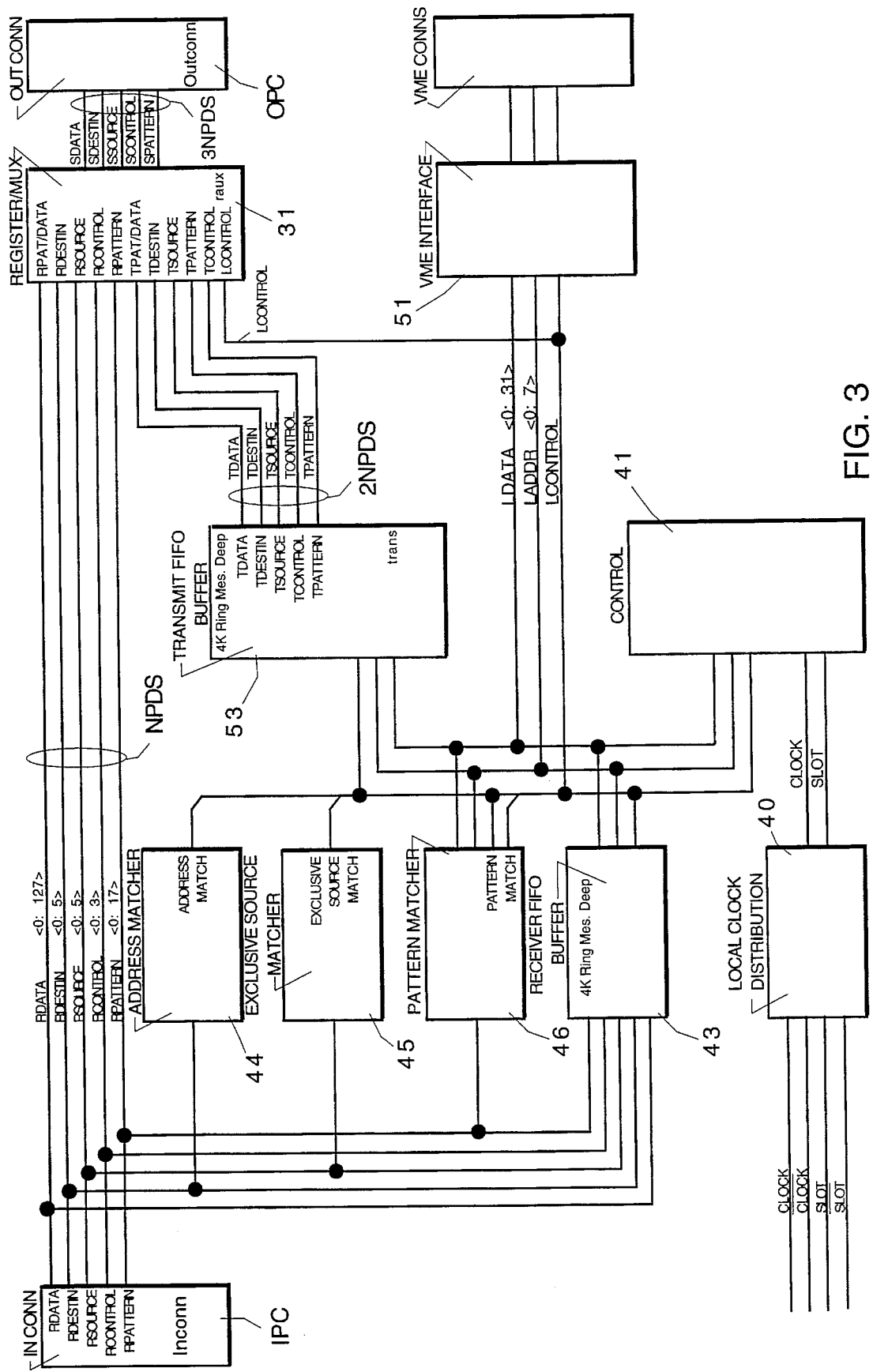
FIG. 3 is a detailed block diagram of a preferred node embodiment.

As noted earlier, each of the processors are connected by a device driver to the node. By virtue of this architecture, ultra high speed node-to-node data transfers (up to 1600 megabytes/second) can be achieved without modification to the data sources or local processor. The distribution of data from various and multiple types of workstations can be easily achieved with total discrimination and selection between stations. Multiple digital formats can be accommodated in a small light weight mobile ring data processing network. Moreover, the system can handle multiple levels of classified data as well as accepting real-time data linked data. Referring now to FIG. 3, showing greater details of the node circuitry, each node is provided with an input connector IPC and an output connector OPC in physical data paths comprising data (128 parallel paths), destination (6 parallel paths), source (6 parallel paths), control (4 parallel paths), and pattern (18 parallel paths). These node data path segments match the parallel ring data path segments on a one-for-one basis and interconnect all nodes in an limitless ring. Each node is provided or assigned a time slot from clock and slot generator 30 which is supplied to a local clock distribution circuit 40. The high ring shift frequency makes use of a precision clock distribution system essential. The ring clock signals and the slot information signals are received by the local clock distribution circuit 40 and delivered to the control 50. Control block 41 provides the logic that implements the functionality of the ring. Events such as reading and writing messages to the ring, specifying a pattern to be read and changing reception modes are controlled by control unit 41.

The signals on the node parallel data path segments are coupled to the 4K ring message receiver FIFO buffer 43. The destination signals are coupled to address matcher 44. The logic of address matcher 44 determines if an incoming message present on the inbound-connector IPC1 was sent via the address mode and, if so, whether it was addressed to this particular node. If it is addressed to this particular node, a signal is generated to direct the control logic 50 to copy the message into the receiver FIFO buffer 43.

A node on the ring may exclude all messages not sent by a particular node as determined by its address. Exclusive source matcher 45 determines if the local node is in exclusive source mode and, if so, compares the incoming message source field with a local register containing the address of the desired sender. If a match occurs, and the other condition for receiving the message are met, a signal is generated to direct the control logic to copy the message into the receiver FIFO buffer 43. Note that the exclusive source matcher 44 is only connected to the source set of parallel data paths in the node parallel data path segments. Pattern matcher 46 is constituted by a 256K by 1 bit dual ported memory. This memory is addressed by the local node host processor via the VME bus interface 51 and by the pattern field of the incoming message. The 262,144 locations in the above memory are assigned a meaning a-priori which is referred to herein as the pattern. If the local host is interested in receiving messages corresponding to a given pattern, it will write a binary 1 into the memory location with the same address. Upon receipt of an incoming message, the pattern field is used to read the memory. If the result of this read is a binary 1 digit, then a signal is generated to direct the control logic to copy the message into the receiver FIFO buffer 43. This memory is also readable by the local host so that it may verify for diagnostic purposes what patterns are currently enabled for receipt.

Multiple level network security is provided by implementing part of the above dual-ported memory in a read-only technology. Only nodes authorized to receive messages under privileged patterns would have a one digit stored in the corresponding ROM locations. The number of levels of security offered under this method is limited only by the number of memory locations implemented in a read-only memory.

Referring to the receiver FIFO buffer memory 43, in order to match the very high message reception rate experienced by a node with the slower rate that messages may be transferred to the host, this first-in, first-out buffer memory is utilized. This buffer 43 can be written with messages at maximum incoming rate of messages from the ring. Messages are stored in the buffer 43 in bit parallel fashion, and the entire message is copied from the inbound connector IPC1. Messages are read out of the buffer 43 by the host completely asynchronously with respect to the above process. Read and write signals as well as clock signals are provided to the receiver and transmitter FIFO memories by the control logic block 50.

Messages from the node are buffered in transmit FIFO buffer 53. Transmit FIFO buffer 53 buffers messages bound for the ring. The bandwidth on the VME interface 51 to the host is better utilized by use of this buffer. The host sends messages to FIFO buffer 53 using the VME bus block transfer mode, minimizing the time required for the transfer. Use of this FIFO buffer 53 also allows the transfer of messages to be completely asynchronous with the ring clock and slot signals which also allows a faster transfer. A further plurality of node data path segments 2NPDS corresponding in number on a one-for-one basis to NPDS couples the transmit FIFO buffer 53 to storage register and multiplexer 31. The storage register and multiplexer incorporates the necessary one-message storage to implement the synchronous parallel ring functionality. On the occurrence of the rising edge of a centrally generated precision clock signal from local clock distribution node 40, the message present in the input side of the message-wide register is transferred to the output side. The input is taken either from the inbound connector IPC1 and the node parallel data path segments, or from the node parallel data paths segments 2NPDS from the transmit FIFO buffer 53, depending on the state of the slot signal from the local clock distribution circuit 40. The slot signal indicates to all nodes when it is time for them to place messages onto the ring.

The VME bus interface 51 provides an industry standard interface between the ring and the local host, whether it be a workstation, data reader or other equipment. The implementation provides 32 bit data and address paths as well as vectored interrupts for informing the host of node events. By using this interface 51, the ring node appears to the host as a portion of its memory address space.

The local clock distribution circuit 40 couples the high ring shift frequency from the precision clock to the node. The ring clock signals are delivered to the ring shift elements of the register multiplexer block 31 with a total skew of less than one nanosecond. This is accomplished by using gallium arsenide integrated circuit technology.

There has thus been illustrated and described a high speed slotted ring architecture for ultra high speed node-to-node data transfer (up to 1600 megabytes/second). It requires no modifications to data sources which are easily interfaced to the system using standard interfacing circuitry. Data is distributed to multiple types of workstations and is received from multiple types of data sources. The system enables total discrimination and selection between nodes and provides for multiple digital formats (MIL STD, Navy AVIcraft) It is small, light weight and mobile and can handle multiple levels of classified data, as well as accept real-time data linked data.

While there has been shown and described one preferred embodiment of the invention, it will be appreciated that other modification and adaptations thereof will become readily apparent to those skilled in the art.

What is claimed is:

1. A high speed data collection, processing and distribution system for coupling a plurality of digital data sources to a plurality of digital data processors, comprising:

a plurality of segmented parallel data paths and a plurality of nodes connecting said segmented parallel data paths to a limitless ring, each node of said plurality of nodes including:

an input connector means for connecting the end of one of said segments of parallel data paths on a one-for-one basis, a data multiplexer, a plurality of node parallel data paths in said node corresponding to said segmented parallel data paths, respectively, and connected to said input connector means and said data multiplexer such that data input to said multiplexer data corresponds to respective ones of said segmented parallel data paths, a processor means coupled to said node parallel data paths, and as a second input to said multiplexer means, a common source of clock signals and means for generating a slot signal for each node connected to said processor means for controlling the timing thereof, and wherein:

each said node further including:

an exclusive source matching circuit connected to said input connector means for producing an exclusive source signal if the node is in an exclusive source mode and comprising an incoming message source field with a local storage register containing the address if the desired sender and if a match is achieved causing said incoming message to be stored in said receiver FIFO buffer memory.

2. A high speed data collection, processing and distribution system for coupling a plurality of digital data sources to a plurality of digital data processors, comprising:

a plurality of segmented parallel data paths and a plurality of nodes connecting said segmented parallel data paths to a limitless ring, each node of said plurality of nodes including:

an input connector means for connecting the end of one of said segments of parallel data paths on a one-for-one basis, a data multiplexer, a plurality of node parallel data paths in said node corresponding to said segmented parallel data paths, respectively, and connected to said input connector means and said data multiplexer such that data input to said multiplexer data corresponds to respective ones of said segmented parallel data paths, a processor means coupled to said node parallel data paths, and as a second input to said multiplexer means, a common source of clock signals and means for generating a slot signal for each node connected to said processor means for controlling the timing thereof, and wherein:

each said node further including:

a receiver FIFO buffer memory for storing messages in bit parallel fashion, an address matcher circuit connected to said input connector means for detecting if a node specific incoming message on said segmented parallel data paths is addressed to the node and causing said incoming node specific message to be stored in the receiver FIFO buffer memory, means for asynchronously writing said receiver FIFO buffer memory from the parallel paths on the ring and reading said receiver FIFO buffer memory by said processor means.

3. The high speed data collection, processing and distribution system defined in claim 2, each node including:

a pattern matcher circuit connected to said input connector means, including a dual ported memory having memory positions pre-assigned in a given pattern, and upon receipt of an incoming message, having a corresponding bit pattern, causing said message to be stored in said receiver FIFO buffer memory.

4. The high speed data collection, processing and distribution system defined in claim 2 including a multilevel security system comprising:

a receiver FIFO memory buffer, a pattern matcher circuit including a read-only memory, for storing a predetermined pattern of data bits, and comparing incoming messages with said predetermined pattern and upon matching said pattern, storing a message in said receiver FIFO memory.

5. The high speed data collection, processing and distribution system defined in claims 2, 1, or 3, including a transmit FIFO buffer connected between said processor means and said multiplexer.

* * * * *